United States Patent
Minami et al.

(10) Patent No.: US 9,221,972 B2
(45) Date of Patent: Dec. 29, 2015

(54) POLY-3-HYDROXYALKANOATE RESIN COMPOSITION AND MOLDED ARTICLE

(71) Applicant: KANEKA CORPORATION, Osaka-shi (JP)

(72) Inventors: Tetsuya Minami, Settsu (JP); Kenichiro Nishiza, Settsu (JP); Noriyuki Suzuki, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 14/410,895

(22) PCT Filed: Jun. 13, 2013

(86) PCT No.: PCT/JP2013/003735
§ 371 (c)(1),
(2) Date: Dec. 23, 2014

(87) PCT Pub. No.: WO2014/002417
PCT Pub. Date: Jan. 3, 2014

(65) Prior Publication Data
US 2015/0166785 A1    Jun. 18, 2015

(30) Foreign Application Priority Data

Jun. 29, 2012 (JP) .................. 2012-146453

(51) Int. Cl.
*C08L 67/04* (2006.01)
*C08L 31/04* (2006.01)
*B29C 47/00* (2006.01)

(52) U.S. Cl.
CPC .............. *C08L 67/04* (2013.01); *C08L 2201/06* (2013.01)

(58) Field of Classification Search
CPC ............................ C08L 67/04; C08L 2201/06
USPC ........................................................ 525/190
See application file for complete search history.

(56) References Cited

U.S. PATENT DOCUMENTS

2008/0071018 A1    3/2008 Smillie et al.

FOREIGN PATENT DOCUMENTS

| JP | 6 503847 | 4/1994 |
| JP | 9 151310 | 6/1997 |
| JP | 2011 136428 | 7/2011 |
| JP | 2010 504396 | 2/2012 |

OTHER PUBLICATIONS

Yoon et al, "Compatibility of poly(3-hydroxybutyrate)/poly(ethylene-co-vinyl acetate) blends," Polymer, vol. 39 (12), 2479-2487, 1998.*
Kim et al, "Biodegradability of poly(3-hydroxybutyrate) blended with poly(ethylene-co-vinyl acetate) or poly(ethylene oxide)," European Polymer Journal, vol. 35, Issue 6, 1153-1158, Jun. 1999.*
International Search Report Issued Sep. 3, 2013 in PCT/JP13/003735 Filed Jun. 13, 2013.
U.S. Appl. No. 14/439,512, filed Apr. 29, 2015, Suzuki et al.
U.S. Appl. No. 14/435,297, filed Apr. 13, 2015, Suzuki et al.

* cited by examiner

*Primary Examiner* — Fred M Teskin
(74) *Attorney, Agent, or Firm* — Oblon, McClelland, Maier & Neustadt, L.L.P.

(57) ABSTRACT

A poly-3-hydroxyalkanoate resin composition having excellent ductility and transparency, and a molded article thereof. The poly-3-hydroxyalkanoate resin composition includes: a poly-3-hydroxyalkanoate resin (A); and an ethylene-vinyl acetate copolymer resin (B) having a vinyl acetate content of 65 to 95 wt %, wherein the resin (A) and the resin (B) are miscible and a ratio of resin (A)/resin (B) is 90/10 to 55/45 (wt/wt). The molded article is produced using such a poly-3-hydroxyalkanoate resin composition.

20 Claims, 2 Drawing Sheets

POLY-3-HYDROXYALKANOATE RESIN COMPOSITION AND MOLDED ARTICLE

This application is a 371 of PCT/JP13/03735 filed Jun. 13, 2013. Priority to Japanese patent application 2012-146453, filed Jun. 29, 2012, is claimed.

TECHNICAL FIELD

The present invention relates to a resin composition containing a biodegradable poly-3-hydroxyalkanoate resin and an ethylene-vinyl acetate copolymer resin and a molded article thereof.

BACKGROUND ART

In recent years, biodegradable plastics have been actively developed to solve a problem that plastic waste has a great impact on the global environment such as impact on ecosystems, generation of harmful gas upon incineration, and global warming due to large amounts of heat generated by incineration.

Particularly, carbon dioxide emitted by incinerating plant-based biodegradable plastics was originally in the atmosphere, and therefore does not increase the amount of carbon dioxide in the atmosphere. This is called "carbon neutral". Recently, the entry into force of the Kyoto Protocol that sets targets for reducing carbon dioxide emissions has become a real possibility. Therefore, plant-based biodegradable plastics are considered to be important and expected to be positively used.

Recently, from the viewpoint of biodegradability and carbon neutral, aliphatic polyester resins have attracted attention as plant-based plastics. Particularly, polyhydroxyalkanoate (hereinafter, sometimes referred to as PHA) resins have attracted attention. Among PHA resins, a poly(3-hydroxybutyrate) homopolymer resin (hereinafter, sometimes referred to as P3HB resin), a poly(3-hydroxybutyrate-co-3-hydroxyvalerate) copolymer resin (hereinafter, sometimes referred to as P3HB3HV resin), a poly(3-hydroxybutyrate-co-3-hydroxyhexanoate) copolymer resin (hereinafter, sometimes referred to as P3HB3HH resin), a poly(3-hydroxybutyrate-co-4-hydroxybutyrate) copolymer resin (hereinafter, sometimes referred to as P3HB4HB resin), and polylactic acid (hereinafter, sometimes referred to as PLA) have attracted attention.

However, it is known that such hard PHA resins are slowly crystallized and therefore become brittle due to a temporal change after molding processing.

Generally, a plasticizer is added to impart flexibility to a hard resin. In this case, however, there is a problem that bleed-out occurs due to the use of a large amount of plasticizer.

Patent Document 1 discloses a technique in which poly (hydroxyalkanoic acid) is blended with an ethylene/vinyl acetate copolymer so that excellent impact strength is imparted while a certain degree of transparency is maintained. According to Patent Document 1, the vinyl acetate content of the ethylene/vinyl acetate copolymer is 6 wt % or more. However, miscibility and the improvement effect vary depending on the combination of the vinyl acetate content of the ethylene/vinyl acetate copolymer and the type of poly (hydroxyalkanoic acid) used, and therefore satisfactory transparency and impact strength are not achieved.

Patent Document 2 discloses a composition obtained by blending biodegradable P3HB3HV resin with an ethylene/vinyl acetate copolymer having a vinyl acetate content of 5 to 30 wt %. According to Patent Document 2, a certain percentage of the composition has biodegradability, and the elasticity or elongation at break of the composition can be controlled within a certain range. However, P3HB3HV resin is immiscible with the copolymer, and therefore blending with the copolymer reduces transparency. Further, the ethylene copolymer needs to be blended to account for almost half of the composition in order to impart satisfactory ductility to the composition containing P3HB3HV resin, which reduces biodegradability.

Patent Document 3 discloses a composition comprising a lactic acid polymer and an ethylene/vinyl acetate copolymer having a vinyl acetate content of 30 to 90 wt %. According to Patent Document 3, the composition prevents blocking of films, has excellent elongation at break, and further has excellent transparency. However, the transparency and elongation at break of the composition are not necessarily satisfactory.

Patent Document 4 discloses a heat-shrinkable laminate film comprising: a layer comprising a resin composition containing a polylactic acid resin as a main ingredient and an ethylene-vinyl acetate resin; and a layer comprising a resin composition containing a polylactic acid resin, a polyolefin resin, and a compatibilizer that makes the polylactic acid resin and the polyolefin resin compatible. According to Patent Document 4, a heat-shrinkable laminate film having excellent transparency and ductility can be obtained by laminating at least the above-described two different layers. However, the layer comprising a resin composition containing a polylactic acid resin as a main component and an ethylene-vinyl acetate resin does not necessarily have satisfactory ductility as a film by itself.

Patent Document 1: JP-T-2010-504396
Patent Document 2: JP-T-6-503847
Patent Document 3: JP-A-9-151310
Patent Document 4: JP-A-2011-136428

DISCLOSURE OF THE INVENTION

Problems to be Solved by the Invention

It is an object of the present invention to provide a poly-3-hydroxyalkanoate resin composition having excellent ductility and transparency and a molded article thereof.

Means for Solving the Problems

In order to achieve the above object, the present inventors have intensively studied, and as a result have found that when a molded article comprises a poly-3-hydroxyalkanoate resin composition in which a poly-3-hydroxyalkanote resin and an ethylene-vinyl acetate copolymer resin (hereinafter, sometimes referred to as EVA) having a vinyl acetate content of 65 to 95 wt % and excellent ductility are miscible, the embrittlement of the molded article due to a temporal change can be suppressed and a reduction in the transparency of the molded article can be prevented. This finding has led to the completion of the present invention.

That is, a first aspect of the present invention is directed to a poly-3-hydroxyalkanoate resin composition comprising: a poly-3-hydroxyalkanoate resin (A); and an ethylene-vinyl acetate copolymer resin (B) having a vinyl acetate content of 65 to 95 wt %, wherein the resin (A) and the resin (B) are miscible and a ratio of resin (A)/resin (B) is 90/10 to 55/45 (wt/wt). It is preferred that in the poly-3-hydroxyalkanoate resin composition, the poly-3-hydroxyalkanoate resin (A) has a 3-hydroxybutyrate content of 80 mol % or more. A second aspect of the present invention is directed to a molded article comprising the poly-3-hydroxyalkanoate resin composition.

Effects of the Invention

According to the present invention, it is possible to provide a poly-3-hydroxyalkanoate resin composition having excellent ductility and transparency and a molded article thereof.

PREFERRED MODE FOR CARRYING OUT THE INVENTION

Hereinbelow, the present invention will be described in more detail. A poly-3-hydroxyalkanoate resin (hereinafter, sometimes referred to as P3HA resin) composition according to the present invention comprises: a specific P3HA resin (A); and an ethylene-vinyl acetate copolymer resin (B) having a given vinyl acetate (hereinafter, sometimes referred to as VA) content, wherein the resin (A) and the resin (B) are miscible.

The P3HA resin (A) used in the present invention is preferably a polymer resin having a 3-hydroxybutyrate content of 80 mol % or more, more preferably 85 mol % or more. Further, the P3HA resin (A) is preferably produced by a microorganism. Specific examples of the P3HA resin (A) include a poly(3-hydroxybutyrate) homopolymer resin, a poly(3-hydroxybutyrate-co-3-hydroxypropionate) copolymer resin, a poly(3-hydroxybutyrate-co-3-hydroxyvalerate) copolymer resin, a poly(3-hydroxybutyrate-co-3-hydroxyhexanoate) copolymer resin, a poly(3-hydroxybutyrate-co-3-hydroxyheptanoate) copolymer resin, a poly(3-hydroxybutyrate-co-3-hydroxyoctanoate) copolymer resin, a poly(3-hydroxybutyrate-co-3-hydroxynanoate) copolymer resin, a poly(3-hydroxybutyrate-co-3-hydroxydecanoate) copolymer resin, a poly(3-hydroxybutyrate-co-3-hydroxyundecanoate) copolymer resin, and a poly(3-hydroxybutyrate-co-4-hydroxybutyrate) copolymer resin. Particularly, from the viewpoint of molding processability and molded article physical properties, a poly(3-hydroxybutyrate-co-3-hydroxyvalerate) copolymer resin, a poly(3-hydroxybutyrate-co-3-hydroxyhexanoate) copolymer resin, and a poly(3-hydroxybutyrate-co-4-hydroxybutyrate) copolymer resin are preferably used.

As for the P3HA resin, a constituent content between 3-hydroxybutyrate (hereinbelow, sometimes referred to as 3HB) and a comonomer copolymerized with 3-hydroxyvalerate (hereinafter, sometimes referred to as 3HV), 3-hydroxyhexanoate (hereinafter, sometimes referred to as 3HH), or 4-hydroxybutyrate (hereinafter, sometimes referred to as 4HB), that is, the content of monomers in the copolymer resin (3-hydroxybutyrate/comonomer) is preferably 97/3 to 80/20 (mol %/mol %), more preferably 95/5 to 85/15 (mol %/mol %) from the viewpoint of molding processability and molded article quality. If the comonomer content is less than 3 mol %, there is a case where it is difficult to perform molding processing because a molding processing temperature and a pyrolysis temperature are close to each other. If the comonomer content exceeds 20 mol %, there is a case where productivity is reduced because the crystallization of the P3HA resin is slow.

The content of monomers in the copolymer resin as the P3HA resin can be measured by gas chromatography in the following manner. Two milliliters of a mixed liquid of sulfuric acid/methanol (15/85 (weight ratio)) and 2 mL of chloroform are added to about 20 mg of the dry P3HA resin, and the resulting mixture is hermetically sealed and heated at 100° C. for 140 minutes to obtain a methyl ester of a P3HA resin degradation product. After cooling, 1.5 g of sodium hydrogen carbonate is added thereto little by little for neutralization, and the resulting mixture was allowed to stand until the generation of carbon dioxide gas is stopped. The mixture was well mixed with 4 mL of diisopropyl ether to obtain a supernatant, and then the monomer unit composition of the P3HA resin degradation product in the supernatant is analyzed by capillary gas chromatography to determine the content of monomers in the copolymer resin.

The gas chromatography is performed using a gas chromatograph "GC-17A" manufactured by Shimadzu Corporation and a capillary column "NEUTRA BOND-1" (column length: 25 m, inner diameter of column: 0.25 mm, liquid film thickness: 0.4 μm) manufactured by GL Sciences Inc. Helium (He) is used as a carrier gas at a column inlet pressure of 100 kPa, and the amount of a sample to be injected is 1 μL. As for temperature conditions, the temperature is increased from an initial temperature of 100° C. to 200° C. at a rate of 8° C./min, and is further increased from 200° C. to 290° C. at a rate of 30° C./min.

The weight-average molecular weight (hereinafter, sometimes referred to as Mw) of the P3HA resin used in the present invention is preferably 200000 to 2500000, more preferably 250000 to 2000000, even more preferably 300000 to 1000000. If the weight-average molecular weight is less than 200000, there is a case where mechanical properties are poor. If the weight-average molecular weight exceeds 2500000, there is a case where it is difficult to perform molding processing.

The weight-average molecular weight can be determined as a molecular weight based on polystyrene standards by gel permeation chromatography using "Shodex GPC-101" manufactured by SHOWA DENKO K.K., a polystyrene gel column "Shodex K-804" manufactured by SHOWA DENKO K.K., and chloroform as a mobile phase. In this case, a calibration curve is created using polystyrene standards having weight-average molecular weights of 31400, 197000, 668000, and 1920000.

It is to be noted that the P3HA resin is produced by, for example, a microorganism such as *Alcaligenes eutrophus* AC32 produced by introducing an *Aeromonas caviae*-derived PHA synthetase gene into *Alcaligenes eutrophus* (International deposit under the Budapest Treaty, International depositary authority: National Institute of Technology and Evaluation, International Patent Organism Depositary (Chuo 6, 1-1-1, Higashi, Tsukuba-shi, Ibaraki, Japan), Date of original deposit: Aug. 12, 1996, transferred on Aug. 7, 1997, Deposit number: FERM BP-6038 (transferred from original deposit FERM P-15786)) (J. Bacteriol., 179, 4821 (1997)).

The VA content of the ethylene-vinyl acetate copolymer resin (B) used in the present invention is preferably 65 to 95 wt %, more preferably 70 to 90 wt %. If the VA content is less than 65 wt %, there is a case where the ethylene-vinyl acetate copolymer resin (B) is immiscible with the P3HA resin so that transparency is reduced. If the vinyl acetate content exceeds 95 wt %, there is a case where a relatively large amount of the EVA needs to be blended to impart ductility to the P3HA resin. It is to be noted that the VA content of the EVA can be determined in accordance with JIS K 7192.

The melt flow rate (hereinafter, sometimes referred to as MFR) of the ethylene-vinyl acetate copolymer resin (B) is preferably 0.1 to 1000 g/10 min, more preferably 0.5 to 500 g/10 min, even more preferably 1 to 100 g/10 min. If the MFR is less than 0.1 g/10 min, the ethylene-vinyl acetate copolymer resin (B) tends to be immiscible with the P3HA resin, and if the MFR exceeds 1000 g/10 min, ductility tends not to be sufficiently improved.

It is to be noted that the MFR of the EVA can be determined in accordance with JIS K 7210.

Specific examples of the EVA include "Levapren 650HV" (EVA with a VA content of 65 wt %) manufactured by LANXESS, "Levapren 700HV" (EVA with a VA content of 70 wt %) manufactured by LANXESS, "Levapren 800HV" (EVA with a VA content of 80 wt %) manufactured by LANXESS, "Levapren 900HV" (EVA with a VA content of 90 wt %) manufactured by LANXESS, "Levapren 700XL" (partially-crosslinked EVA with a VA content of 70 wt %) manufactured by LANXESS, "Levapren 800XL" (partially-crosslinked EVA with a VA content of 80 wt %) manufactured by LANXESS, "Levamelt 700" (EVA with a VA content of 70 wt %) manufactured by LANXESS, "Levamelt 800" (EVA with a VA content of 80 wt %) manufactured by LANXESS, and "Soarblen DH" (EVA with a VA content of 70 wt %) manufactured by The Nippon Synthetic Chemical Industry Co., Ltd. At least one of them can be used.

Meanwhile, in the case of polylactic acid as one of polyhydroxyalkanoate resins, transparency is not reduced even by blending with EVA having a VA content of 90 wt %, but the ductility of a polylactic acid/EVA blend is hardly improved. Further, when polylactic acid is blended with EVA having a VA content of 50 wt %, ductility is improved to some extent, but transparency is reduced. However, when a P3HA resin having a 3-hydroxybutyrate content of 80 mol % or more is blended with EVA having a VA content of 65 to 95 wt % according to the present invention, ductility can be imparted to the resulting P3HA resin composition without reducing transparency. Therefore, excellent ductility and transparency cannot be achieved at the same time even by blending polylactic acid with EVA having a VA content of 65 to 95 wt %, but can be achieved at the same time by blending the above-described P3HA resin having a 3-hydroxybutyrate content of 80 mol % or more with EVA having a VA content of 65 to 95 wt %.

The P3HA resin/EVA ratio of the P3HA resin composition is preferably from 90/10 to 55/45 (wt/wt), more preferably from 90/10 to 70/30 (wt/wt), even more preferably from 85/15 to 70/30 (wt/wt).

If the P3HA resin/EVA ratio exceeds 90/10, there is a case where ductility cannot be imparted to the P3HA resin composition. If the P3HA resin/EVA ratio is less than 55/45, there is a case where the molding processability of the P3HA resin composition can be reduced so that productivity can be decreased.

The P3HA resin composition according to the present invention contains the P3HA resin (A) and the EVA (B) at a predetermined ratio so that the P3HA resin (A) and the EVA (B) are miscible. Therefore, a molded article comprising the P3HA resin composition according to the present invention has excellent ductility and transparency.

Miscibility between the PHA resin and the EVA used in the present invention can be determined using a transmission electron microscope ("H-7650" manufactured by Hitachi, Ltd.). Specifically, the PHA resin composition or a molded article comprising the PHA resin composition is stained with $RuO_4$ and observed with the transmission electron microscope at 10000- to 40000-fold magnification, and when the PHA resin and the EVA are dispersed and cannot be discriminated from each other, they are considered to be "miscible", and when the PHA resin forms a continuous phase and the EVA forms a dispersion phase, they are considered to be "immiscible".

The P3HA resin composition according to the present invention in which the P3HA resin (A) and the EVA (B) are miscible can be easily obtained by melt-kneading the P3HA resin and the EVA at a temperature equal to or higher than the melting point of the P3HA resin or by blending the P3HA resin and the EVA in a solvent, such as chloroform, that can dissolve them. However, from the viewpoint of productivity, the P3HA resin composition according to the present invention is preferably produced by melt-kneading.

The P3HA resin composition according to the present invention may contain various additives without impairing the effects of the present invention. Examples of the additives include lubricants, crystallization nucleating agents, plasticizers, hydrolysis suppressors, antioxidants, release agents, ultraviolet absorbers, colorants such as dyes and pigments, and inorganic fillers. These additives can be used according to the intended use of the P3HA resin composition. These additives are preferably biodegradable.

Other examples of the additives include inorganic fibers such as carbon fibers and organic fibers such as human hair and sheep wool. Further, natural fibers can also be used. Examples of the natural fibers include bamboo fibers, pulp fibers, kenaf fibers, other similar plant alternate species, annual herb plants of the family Malvaceae, genus *Hibiscus*, and annual herb plants of the family Tiliaceae. From the viewpoint of carbon dioxide reduction, plant-based natural fibers are preferred, and kenaf fibers are particularly preferred.

A method for producing the P3HA resin composition according to the present invention and a molded article thereof will be described below.

Method for Producing Molded Article Comprising P3HA Resin Composition

First, the P3HA resin, the EVA, and if necessary, the additives are melt-kneaded using an extruder, a kneader, a banbury mixer, or a roll to produce a P3HA resin composition. The P3HA resin composition is extruded into a strand and cut to obtain particulate pellets of the P3HA resin composition having a cylindrical, elliptic cylindrical, spherical, cubical, or a rectangular parallelepiped shape.

The temperature at which the P3HA resin, the EVA, etc. are melt-kneaded in such a manner as described above depends on the melting point, melt viscosity, etc. of the P3HA resin used or the melt viscosity etc. of the EVA, but the resin temperature of the melt-kneaded product at the outlet of a die is preferably 140 to 200° C., more preferably 150 to 195° C., even more preferably 160 to 190° C. When the temperature of the melt-kneaded product is less than 140° C., there is a case where the P3HA resin and the EVA are immiscible, and when the temperature of the melt-kneaded product exceeds 200° C., there is a case where the P3HA resin is pyrolyzed.

The pellets produced by the above method are well dried at 40 to 80° C. to remove moisture, and are then subjected to molding processing by a known molding processing method to obtain any molded article. Examples of the molding processing method include film molding, sheet molding, injection molding, blow molding, fiber spinning, extrusion foaming, and bead foaming.

Examples of a method for producing a film molded article include T-die extrusion molding, calender molding, roll molding, and inflation molding. However, the film molding method is not limited thereto. The temperature at which film molding is performed is preferably 140 to 190° C. Further, a film obtained from the P3HA resin composition according to the present invention can be subjected to thermoforming, vacuum molding, or press molding.

Examples of a method for producing an injection-molded article include injection molding methods such as an injection molding method generally used for molding a thermoplastic resin, a gas-assist molding method, and an injection compression molding method. Alternatively, a method other than the above methods, such as an in-mold molding method, a gas press molding method, a two-color molding method, a sandwich molding method, PUSH-PULL, or SCORIM, may be used according to the intended use of the molded article. However, the injection molding method is not limited thereto. The temperature at which injection molding is performed is preferably 140 to 190° C., and a mold temperature is preferably 20 to 80° C., more preferably 30 to 70° C.

The molded article according to the present invention can be appropriately used in the fields of agriculture, fishing industry, forestry, gardening, medicine, sanitary articles, food industry, clothing, non-clothing, packaging, automobiles, building materials, etc.

EXAMPLES

Hereinbelow, the present invention will be more specifically described with reference to examples. However, the present invention is not limited to these examples. It is to be noted that in the examples, "part(s)" and "%" are by weight.

Measurement of Content of Monomers in Copolymer as poly-3-Hydroxyalkanoate Resin Two milliliters of a mixed liquid of sulfuric acid/methanol (15/85 (weight ratio)) and 2 mL of chloroform were added to about 20 mg of a dry P3HA resin, and the resulting mixture was hermetically sealed and heated at 100° C. for 140 minutes to obtain a methyl ester of a P3HA resin degradation product. After cooling, 1.5 g of sodium hydrogen carbonate was added thereto little by little for neutralization, and the resulting mixture was allowed to stand until the generation of carbon dioxide gas was stopped. The mixture was well mixed with 4 mL of diisopropyl ether to obtain a supernatant, and then the monomer unit composition of the P3HA resin degradation product in the supernatant was analyzed by capillary gas chromatography to determine the content of monomers in the copolymer resin.

The gas chromatography was performed using a gas chromatograph "GC-17A" manufactured by Shimadzu Corporation and a capillary column "NEUTRA BOND-1" (column length: 25 m, inner diameter of column: 0.25 mm, liquid film thickness: 0.4 μm) manufactured by GL Sciences Inc. Helium (He) was used as a carrier gas at a column inlet pressure of 100 kPa, and the amount of a sample to be injected was 1 μL. As for temperature conditions, the temperature was increased from an initial temperature of 100° C. to 200° C. at a rate of 8° C./min, and was further increased from 200 to 290° C. at a rate of 30° C./min.

Measurement of Weight-Average Molecular Weight of Poly-3-Hydroxyalkanoate Resin

The weight-average molecular weight of a P3HA resin was determined as a molecular weight based on polystyrene standards by gel permeation chromatography using "Shodex GPC-101" manufactured by SHOWA DENKO K.K., a polystyrene gel column "Shodex K-804" manufactured by SHOWA DENKO K.K., and chloroform as a mobile phase. In this case, a calibration curve was created using polystyrene standards having weight-average molecular weights of 31400, 197000, 668000, and 1920000.

Figure 1:
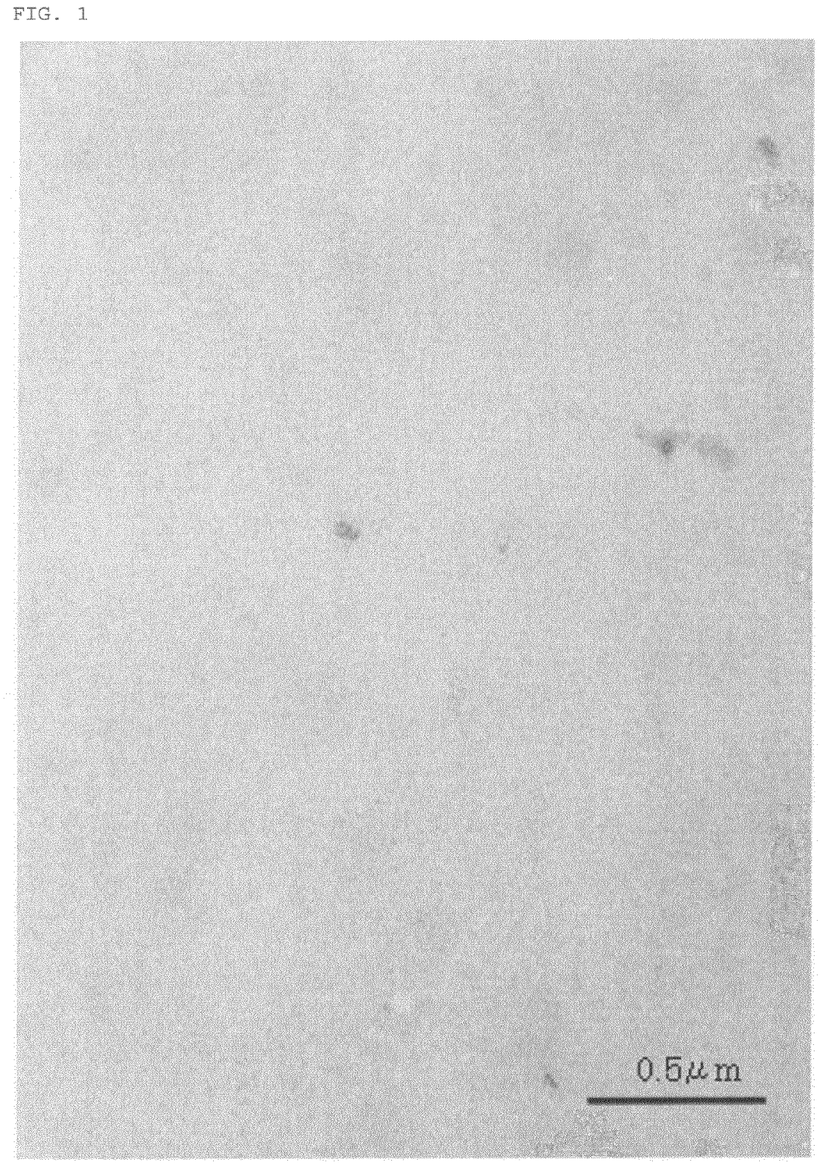
FIG. 1 is a transmission electron micrograph used to determine miscibility between a polyhydroxyalkanoate resin (PHA resin) and an ethylene-vinyl acetate copolymer resin (EVA), which shows a state where the PHA resin and the EVA cannot be discriminated from each other, that is, they are considered to be "miscible".
Figure 2:
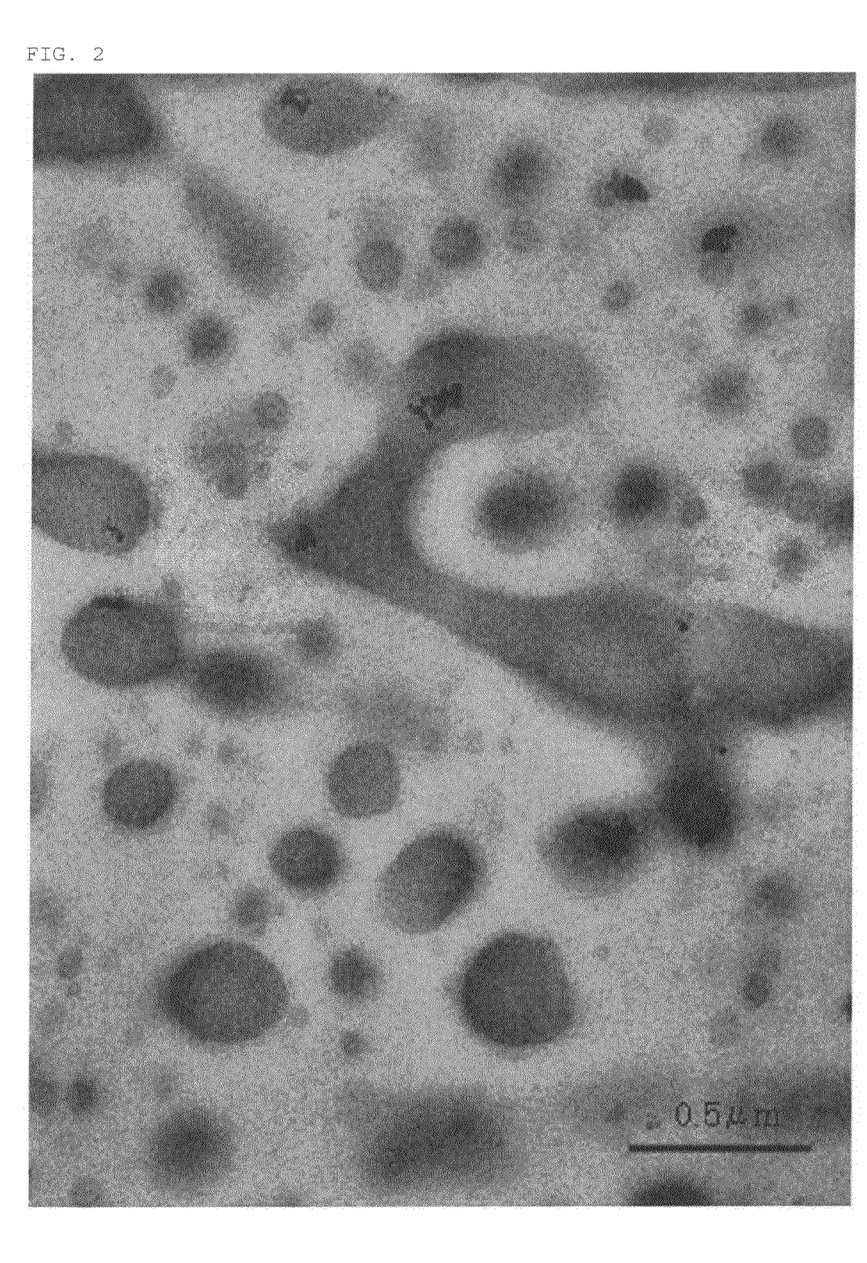
FIG. 2 is a transmission electron micrograph used to determine miscibility between a polyhydroxyalkanoate resin (PHA resin) and an ethylene-vinyl acetate copolymer resin (EVA), which shows a state where the PHA resin forms a continuous phase and the EVA forms a dispersion phase, that is, they are considered to be "immiscible".

Determination of Miscibility Between Polyhydroxyalkanoate Resin and Ethylene-Vinyl Acetate Copolymer Resin A PHA resin composition or a molded article comprising the PHA resin composition was stored for 1 month in an atmosphere of 23° C. and a humidity of 50% and then stained with $RuO_4$ and observed with a transmission electron microscope ("H-7650 manufactured by Hitachi, Ltd.) at 10000- to 40000-fold magnification, and when a PHA resin and EVA were dispersed and could not be discriminated from each other (large black domains were not observed at all), they were considered to be "miscible" (FIG. 1), and when a PHA resin formed a continuous phase and EVA formed a dispersion phase (observed as large black domains), they were considered to be "immiscible" (FIG. 2).

Measurement of Tensile Strength at Yield and Elongation at Break of T-die Film

A T-die film having a thickness of 100 μm was stored for 1 month in an atmosphere of 23° C. and a humidity of 50%. Then, in accordance with JIS K 7113, 10 dumbbell specimens (small specimens of No. 2(1/3)) were cut out from the T-die film along the machine direction of the film, and the tensile strength at yield and elongation at break of the specimens were measured 10 times with the use of a tensile tester ("AUTOGRAPH AG2000A manufactured by Shimadzu Corporation) at a test rate of 100 mm/min, and their averages were regarded as the tensile strength at yield and elongation at break of the T-die film.

Evaluation of Transparency of T-die Film

A 100 μm-thick T-die film made of a PHA resin composition and a 100 μm-thick T-die film made of a PHA resin used as a raw material of the PHA resin composition were stored for 1 month in an atmosphere of 23° C. and a humidity of 50%. Then, the haze value of each of the T-die films was measured in accordance with JIS K 7105. When the haze value of the 100 μm-thick T-die film made of a PHA resin composition was higher than, equal to, or lower than that of a PHA resin, the transparency of the T-die film made of a PHA resin composition was evaluated as "x", "Δ", or "○", respectively.

Measurement of Tensile Strength at Yield and Elongation at Break of Injection-Molded Article Dumbbell specimens of an injection-molded article were stored for 1 month in an atmosphere of 23° C. and a humidity of 50%. Then, in accordance with ASTM D638, the tensile strength at yield and elongation at break of the specimens were measured 10 times with the use of an automatic tensile tester ("Strograph AP II" manufactured by Toyo Seiki Seisaku-sho, Ltd.) at a test rate of 5 mm/min, and their averages were regarded as the tensile strength at yield and elongation at break of the injection-molded article.

Evaluation of Transparency of Injection-Molded Article

A 1/64 inch-thick plate made of a PHA resin composition and a 1/64 inch-thick plate made of a PHA resin used as a raw material of the PHA resin composition were stored for 1 month in an atmosphere of 23° C. and a humidity of 50%. Then, the transparency of each of the plates was visually observed. When inferior to, equal to, or superior to the transparency of the 1/64 inch-thick plate made of a PHA resin, the transparency of the 1/64 inch-thick plate made of a PHA resin composition was evaluated as "x", "Δ", or "○", respectively.

Production Example 1

Production of P3HA-1

P3HB3HH resin (PHA-1) having a 3HH content of 5 mol % and a Mw of 750000 was produced in accordance with WO 09/145164.

Production Example 2

Production of P3HA-2

P3HB3HH resin (P3HA-2) having a 3HH content of 13 mol % and a Mw of 700000 was produced in accordance with WO 09/145164.

Production Example 3

Production of P3HA-3

P3HB resin (PHA-3) having a Mw of 850000 was produced using C. necator H16 (ATCC17699) as a production strain in accordance with WO 09/145164.

Other substances used in Examples and Comparative Examples are as follows.

<P3HA-4>
EM5400F (poly(3-hydroxybutyrate-co-4-hydroxybutyrate) copolymer resin, 4HB content: 14 mol %, Mw=1050000) manufactured by Ecomann was used.

<Polylactic Acid>
"Ingeo 4060D" manufactured by NatureWorks was used as polylactic acid.

<Ethylene-Vinyl Acetate Copolymer Resin>
The following ethylene-vinyl acetate copolymer resins were used.

EVA-1: "Levapren 900HV" (EVA with a VA content of 90 wt % and a MFR of 5 g/10 min) manufactured by LANXESS EVA-2: "Levapren 800HV" (EVA with a VA content of 80 wt % and a MFR of 6 g/10 min) manufactured by LANXESS EVA-3: "Levapren 700HV" (EVA with a VA content of 70 wt % and a MFR of 8 g/10 min) manufactured by LANXESS EVA-4: "Levapren 600HV" (EVA with a VA content of 60 wt % and a MFR of 6 g/10 min) manufactured by LANXESS EVA-5: "EVATATE R5011" (EVA with a VA content of 41 wt % and a MFR of 60 g/10 min) manufactured by Sumitomo Chemical Co., Ltd.

EVA-6: "EVATATE K3010" (EVA with a VA content of 28 wt % and a MFR of 7 g/10 min) manufactured by Sumitomo Chemical Co., Ltd.

<Polyvinyl Acetate>
"SAKNOHOL SN-04T" (VA content: 100 wt %) manufactured by DENKI KAGAKUKOGYO KABUSHIKI KAISHA was used as polyvinyl acetate.

Example 1

Production and Evaluation of Film

According to the formulation shown in Table 1, 80 parts by weight of P3HA-1 and 20 parts by weight of EVA (EVA-1, Levapren 900 HV manufactured by LANXESS) having a VA content of 90 wt % were mixed, and then the resulting mixture was melt-kneaded and extruded as a strand (φ: 3.5 mm) with the use of a twin-screw extruder (TEM-26SS manufactured by TOSHIBA MACHINE CO., LTD., Conditions: discharge rate: 15 kg/hr, screw rotation speed: 150 rpm, preset temperature: 150° C.). The strand was cut to a proper length to obtain P3HA resin composition pellets. In this case, the temperature of the melt-kneaded product extruded through the die head of the twin-screw extruder was 185° C.

Then, the obtained P3HA resin composition pellets were well dried at 60° C. and then extruded through a single-screw extruder (Labo Plastomill "20C200" manufactured by Toyo Seiki Seisaku-sho K.K.) equipped with a T-die having a width of 150 mm and a lip gap of 0.15 mm under conditions of a molding temperature of 165° C. and a screw rotation speed of 50 rpm. The extruded film was taken up by a cooling roll adjusted to 55° C. at a rate of 3 m/min to obtain a 100 μm-thick T-die film. The tensile strength at yield, elongation at break, and transparency of the T-die film and the miscibility between the resins in the T-die film were evaluated, and the evaluation results are shown in Table 1.

TABLE 1

Formulation and properties of T-die film
(Formulation unit: parts by weight)

| | | Example 1 | Example 2 | Example 3 | Example 4 | Example 5 | Example 6 | Example 7 | Example 8 | Example 9 |
|---|---|---|---|---|---|---|---|---|---|---|
| Main raw materials used | | P3HA-1 | P3HA-1 | P3HA-1 | P3HA-1 | P3HA-2 | P3HA-3 | P3HA-4 | P3HA-1 | P3HA-1 |
| | 3HB content (mol %) | 95 | 95 | 95 | 95 | 87 | 100 | 86 | 95 | 95 |
| | 3HH content (mol %) | 5 | 5 | 5 | 5 | 13 | — | — | 5 | 5 |
| | 4HB content (mol %) | — | — | — | — | — | — | 14 | — | — |
| | | EVA-1 | EVA-2 | EVA-2 | EVA-2 | EVA-3 | EVA-1 | EVA-1 | EVA-2 | EVA-2 |
| | VA content (wt %) | 90 | 80 | 80 | 80 | 70 | 90 | 90 | 80 | 80 |
| Formulation | P3HA-1 | 80 | 80 | 90 | 60 | — | — | — | 80 | 90 |
| | P3HA-2 | — | — | — | — | 90 | — | — | — | — |
| | P3HA-3 | — | — | — | — | — | 60 | — | — | — |
| | P3HA-4 | — | — | — | — | — | — | 90 | — | — |
| | EVA-1 | 20 | — | — | — | — | 40 | 10 | — | — |
| | EVA-2 | — | 20 | 10 | 40 | — | — | — | 20 | 10 |
| | EVA-3 | — | — | — | — | 10 | — | — | — | — |
| Properties | Tensile strength at yield (MPa) | 30 | 29 | 33 | 26 | 23 | 29 | 20 | 30 | 35 |
| | Elongation at break (%) | 241 | 293 | 225 | 380 | 461 | 323 | 765 | 280 | 173 |
| | Transparency | ○ | ○ | ○ | ○ | ○ | ○ | ○ | ○ | ○ |
| | Miscibility | Miscible | Miscible | Miscible | Miscible | Miscible | Miscible | Miscible | Miscible | Miscible |

TABLE 1-continued

Formulation and properties of T-die film
(Formulation unit: parts by weight)

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Main raw materials used | | P3HA-1 | P3HA-1 | P3HA-1 | P3HA-1 | P3HA-3 | P3HA-1 | — | — |
| | | — | — | — | — | — | — | Polylactic acid | Polylactic acid |
| | 3HB content (mol %) | 95 | 95 | 95 | 95 | 100 | 95 | — | — |
| | 3HH content (mol %) | 5 | 5 | 5 | 5 | — | 5 | — | — |
| | 4HB content (mol %) | — | — | — | — | — | — | — | — |
| | | — | EVA-4 | EVA-5 | EVA-6 | EVA-6 | — | EVA-1 | EVA-4 |
| | VA content (wt %) | — | 60 | 41 | 28 | 28 | 100 | 90 | 60 |
| Formulation | P3HA-1 | 100 | 90 | 90 | 90 | — | 80 | — | — |
| | P3HA-3 | — | — | — | — | 90 | — | — | — |
| | Polylactic acid | — | — | — | — | — | — | 80 | 80 |
| | EVA-1 | — | — | — | — | — | — | 20 | — |
| | EVA-4 | — | 10 | — | — | — | — | — | 20 |
| | EVA-5 | — | — | 10 | — | — | — | — | — |
| | EVA-6 | — | — | — | 10 | 10 | — | — | — |
| | Polyvinyl acetate | — | — | — | — | — | 20 | — | — |
| Properties | Tensile strength at yield (MPa) | 36 | 33 | 32 | 32 | 35 | 34 | 53 | 50 |
| | Elongation at break (%) | 5 | 38 | 31 | 29 | 15 | 19 | 25 | 71 |
| | Transparency | Δ | x | x | x | x | ○ | ○ | x |
| | Miscibility | — | Immiscible | Immiscible | Immiscible | Immiscible | Miscible | Miscible | Immiscible |

Example 2

Production and Evaluation of Film

3HA resin composition pellets and a 100 μm-thick T-die film were obtained in the same manner as in Example 1 except that EVA-1 was changed to EVA-2 according to the formulation shown in Table 1. The tensile strength at yield, elongation at break, and transparency of the T-die film and the miscibility between the resins in the T-die film were evaluated, and the evaluation results are shown in Table 1.

Example 3

Production and Evaluation of Film

P3HA resin composition pellets and a 100 μm-thick T-die film were obtained in the same manner as in Example 2 except that the amount of P3HA-1 was changed from 80 parts by weight to 90 parts by weight and the amount of EVA-2 was changed from 20 parts by weight to 10 parts by weight according to the formulation shown in Table 1. The tensile strength at yield, elongation at break, and transparency of the T-die film and the miscibility between the resins in the T-die film were evaluated, and the evaluation results are shown in Table 1.

Example 4

Production and Evaluation of Film

P3HA resin composition pellets and a 100 μm-thick T-die film were obtained in the same manner as in Example 2 except that the amount of P3HA-1 was changed from 90 parts by weight to 60 parts by weight and the amount of EVA-2 was changed from 10 parts by weight to 40 parts by weight according to the formulation shown in Table 1. The tensile strength at yield, elongation at break, and transparency of the T-die film and the miscibility between the resins in the T-die film were evaluated, and the evaluation results are shown in Table 1.

Example 5

Production and Evaluation of Film

P3HA resin composition pellets and a 100 μm-thick T-die film were obtained in the same manner as in Example 3 except that P3HA-1 was changed to P3HA-2 and EVA-2 was changed to EVA-3 according to the formulation shown in Table 1. The tensile strength at yield, elongation at break, and transparency of the T-die film and the miscibility between the resins in the T-die film were evaluated, and the evaluation results are shown in Table 1.

Example 6

Production and Evaluation of Film

P3HA resin composition pellets and a 100 μm-thick T-die film were obtained in the same manner as in Example 4 except that P3HA-1 was changed to P3HA-3 and EVA-2 was changed to EVA-1 according to the formulation shown in Table 1. The tensile strength at yield, elongation at break, and transparency of the T-die film and the miscibility between the resins in the T-die film were evaluated, and the evaluation results are shown in Table 1.

Example 7

Production and Evaluation of Film

P3HA resin composition pellets and a 100 μm-thick T-die film were obtained in the same manner as in Example 1 except that 80 parts by weight of P3HA-1 was changed to 90 parts by weight of P3HA-4 and the amount of EVA-1 was changed from 20 parts by weight to 10 parts by weight according to the formulation shown in Table 1. The tensile strength at yield, elongation at break, and transparency of the T-die film and the miscibility between the resins in the T-die film were evaluated, and the evaluation results are shown in Table 1.

Example 8

Evaluation of Film

The T-die film obtained in Example 2 was stored for 1 year in an atmosphere of 23° C. and a humidity of 50%, and was then subjected to a tensile fracture test to evaluate its tensile strength at yield and elongation at break. The evaluation results are shown in Table 1.

Example 9

Evaluation of Film

The T-die film obtained in Example 3 was stored for 1 year in an atmosphere of 23° C. and a humidity of 50%, and was then subjected to a tensile fracture test to evaluate its tensile strength at yield and elongation at break. The evaluation results are shown in Table 1.

Comparative Example 1

Production and Evaluation of Film

A 100 μm-thick T-die film was obtained in the same manner as in Example 1 except that the amount of P3HA-1 was changed from 80 parts by weight to 100 parts by weight and the amount of EVA-1 was changed from 20 parts by weight to 0 part by weight according to the formulation shown in Table 1. The tensile strength at yield, elongation at break, and transparency of the T-die film and the miscibility between the resins in the T-die film were evaluated, and the evaluation results are shown in Table 1.

Comparative Example 2

Production and Evaluation of Film

P3HA resin composition pellets and a 100 μm-thick T-die film were obtained in the same manner as in Example 3 except that EVA-2 was changed to EVA-4 according to the formulation shown in Table 1. The tensile strength at yield, elongation at break, and transparency of the T-die film and the miscibility between the resins in the T-die film were evaluated, and the evaluation results are shown in Table 1.

Comparative Example 3

Production and Evaluation of Film

P3HA resin composition pellets and a 100 μm-thick T-die film were obtained in the same manner as in Example 3 except that EVA-2 was changed to EVA-5 according to the formulation shown in Table 1. The tensile strength at yield, elongation at break, and transparency of the T-die film and the miscibility between the resins in the T-die film were evaluated, and the evaluation results are shown in Table 1.

Comparative Example 4

Production and Evaluation of Film

P3HA resin composition pellets and a 100 μm-thick T-die film were obtained in the same manner as in Example 3 except that EVA-2 was changed to EVA-6 according to the formulation shown in Table 1. The tensile strength at yield, elongation at break, and transparency of the T-die film and the miscibility between the resins in the T-die film were evaluated, and the evaluation results are shown in Table 1.

Comparative Example 5

Production and Evaluation of Film

P3HA resin composition pellets and a 100 μm-thick T-die film were obtained in the same manner as in Example 3 except that P3HA-1 was changed to P3HA-3 and EVA-1 was changed to EVA-6 according to the formulation shown in Table 1. The tensile strength at yield, elongation at break, and transparency of the T-die film and the miscibility between the resins in the T-die film were evaluated, and the evaluation results are shown in Table 1.

Comparative Example 6

Production and Evaluation of Film

P3HA resin composition pellets and a 100 μm-thick T-die film were obtained in the same manner as in Example 1 except that EVA-1 was changed to polyvinyl acetate according to the formulation shown in Table 1. The tensile strength at yield, elongation at break, and transparency of the T-die film and the miscibility between the resins in the T-die film were evaluated, and the evaluation results are shown in Table 1.

Comparative Example 7

Production and Evaluation of Film in Accordance with JP-A-9-151310 and JP-A-2011-136428

PHA resin composition pellets and a 100 μm-thick T-die film were obtained in the same manner as in Example 1 except that P3HA-1 was changed to polylactic acid according to the formulation shown in Table 1. The tensile strength at yield, elongation at break, and transparency of the T-die film and the miscibility between the resins in the T-die film were evaluated, and the evaluation results are shown in Table 1.

Comparative Example 8

Production and Evaluation of Film in Accordance with JP-A-9-151310 and JP-A-2011-136428

PHA resin composition pellets and a 100 μm-thick T-die film were obtained in the same manner as in Comparative Example 7 except that EVA-1 was changed to EVA-4 according to the formulation shown in Table 1. The tensile strength at yield, elongation at break, and transparency of the T-die film and the miscibility between the resins in the T-die film were evaluated, and the evaluation results are shown in Table 1.

Example 10

Production and Evaluation of Injection-Molded Article

The P3HA resin composition pellets obtained in Example 3 were well dried at 60° C. and then subjected to injection molding using a 75 t injection molding machine ("IS-75E-2A" manufactured by TOSHIBA MACHINE CO., LTD.)

under conditions of a molding temperature of 165° C. and a mold temperature of 55° C. to obtain dumbbell specimens based on ASTM D638 and 1/64 inch-thick plates. The tensile strength at yield and elongation at break of the dumbbell specimens, and the transparency of the 1/64 inch-thick plates and the miscibility between the resins in the 1/64 inch-thick plates were evaluated, and the evaluation results are shown in Table 2.

TABLE 2

Formulation and properties of injection-molded article
(Formulation unit: parts by weight)

|  |  | Example 10 | Comparative Example 9 | Comparative Example 10 |
|---|---|---|---|---|
| Main raw materials used |  | P3HA-1 EVA-2 | P3HA-1 — | P3HA-1 EVA-4 |
|  | 3HB content (mol %) | 95 | 95 | 95 |
|  | 3HH content (mol %) | 5 | 5 | 5 |
|  | 4HB content (mol %) | — | — | — |
|  | VA content (wt %) | 80 | — | 60 |
| Formulation | P3HA-1 | 90 | 100 | 90 |
|  | EVA-1 | 10 | — | — |
|  | EVA-4 | — | — | 10 |
| Properties | Tensile strength at yield (MPa) | 26 | 30 | 27 |
|  | Elongation at break (%) | 242 | 11 | 42 |
|  | Transparency | ○ | Δ | x |
|  | Miscibility | Miscible | — | Immiscible |

Comparative Example 9

Production and Evaluation of Injection-Molded Article

Dumbbell specimens based on ASTM D638 and 1/64 inch-thick plates were obtained in the same manner as in Example 8 except that the amount of P3HA-1 was changed from 90 parts by weight to 100 parts by weight and the amount of EVA-2 was changed from 10 parts by weight to 0 part by weight according to the formulation shown in Table 2. The tensile strength at yield and elongation at break of the dumbbell specimens, and the transparency of the 1/64 inch-thick plates and the miscibility between the resins in the 1/64 inch-thick plates were evaluated, and the evaluation results are shown in Table 2.

Comparative Example 10

Production and Evaluation of Injection-Molded Article

Dumbbell specimens based on ASTM D638 and 1/64 inch-thick plates were obtained in the same manner as in Example 8 except that EVA-2 was changed to EVA-4 according to the formulation shown in Table 2. The tensile strength at yield and elongation at break of the dumbbell specimens, and the transparency of the 1/64 inch-thick plates and the miscibility between the resins in the 1/64 inch-thick plates were evaluated, and the evaluation results are shown in Table 2.

The invention claimed is:

1. A resin composition, comprising:
   a poly-3-hydroxyalkanoate resin (A); and
   an ethylene-vinyl acetate copolymer resin (B) having a vinyl acetate content of 70 to 90 wt %,
   wherein:
   the poly-3-hydroxyalkanoate resin (A) and the ethylene-vinyl acetate copolymer resin (B) are miscible, and a weight ratio of the poly-3-hydroxyalkanoate resin (A) with respect to the ethylene-vinyl acetate copolymer resin (B) is from 85/15 to 70/30 in wt/wt; and
   the ethylene-vinyl acetate copolymer resin (B) has a melt flow rate of from 5 to 8 g/10 min.

2. The resin composition according to claim 1, wherein the poly-3-hydroxyalkanoate resin (A) has a 3-hydroxybutyrate content of 80 mol % or more.

3. A molded article, comprising:
   the resin composition according to claim 1.

4. A molded article, comprising:
   the resin composition according to claim 2.

5. The resin composition according to claim 1, wherein the poly-3-hydroxyalkanoate resin (A) has a 3-hydroxybutyrate content of 85 mol % or more.

6. The resin composition according to claim 1, wherein the poly-3-hydroxyalkanoate resin (A) comprises at least one selected from the group consisting of a poly(3-hydroxybutyrate) homopolymer resin, a poly(3-hydroxybutyrate-co-3-hydroxypropionate) copolymer resin, a poly(3-hydroxybutyrate-co-3-hydroxyvalerate) copolymer resin, a poly(3-hydroxybutyrate-co-3-hydroxyhexanoate) copolymer resin, a poly(3-hydroxybutyrate-co-3-hydroxyheptanoate) copolymer resin, a poly(3-hydroxybutyrate-co-3-hydroxyoctanoate) copolymer resin, a poly(3-hydroxybutyrate-co-3-hydroxynanoate) copolymer resin, a poly(3-hydroxybutyrate-co-3-hydroxydecanoate) copolymer resin, a poly(3-hydroxybutyrate-co-3-hydroxyundecanoate) copolymer resin, and a poly(3-hydroxybutyrate-co-4-hydroxybutyrate) copolymer resin.

7. A resin composition, comprising:
   a poly-3-hydroxyalkanoate resin (A); and
   an ethylene-vinyl acetate copolymer resin (B) having a vinyl acetate content of 65 to 95 wt %,
   wherein:
   the poly-3-hydroxyalkanoate resin (A) and the ethylene-vinyl acetate copolymer resin (B) are miscible, and a weight ratio of the poly-3-hydroxyalkanoate resin (A) with respect to the ethylene-vinyl acetate copolymer resin (B) is from 90/10 to 55/45 in wt/wt; and
   the poly-3-hydroxyalkanoate resin (A) comprises at least one selected from the group consisting of a poly(3-hydroxybutyrate-co-3-hydroxyvalerate) copolymer resin, a poly(3-hydroxybutyrate-co-3-hydroxyhexanoate) copolymer resin, and a poly(3-hydroxybutyrate-co-4-hydroxybutyrate) copolymer resin.

8. The resin composition according to claim 7, wherein the weight ratio of the poly-3-hydroxyalkanoate resin (A) with respect to the ethylene-vinyl acetate copolymer resin (B) is from 90/10 to 70/30.

9. The resin composition according to claim 7, wherein the weight ratio of the poly-3-hydroxyalkanoate resin (A) with respect to the ethylene-vinyl acetate copolymer resin (B) is from 85/15 to 70/30.

10. The resin composition according to claim 7, wherein the vinyl acetate content in the ethylene-vinyl acetate copolymer resin (B) is from 70 to 90 wt %.

11. The resin composition according to claim 7, wherein the poly-3-hydroxyalkanoate resin (A) has a 3-hydroxybutyrate content of 80 mol % or more.

12. The resin composition according to claim 7, wherein the poly-3-hydroxyalkanoate resin (A) has a 3-hydroxybutyrate content of 85 mol % or more.

13. The resin composition according to claim 7, wherein the vinyl acetate content in the ethylene-vinyl acetate copolymer resin (B) is from 70 to 90 wt %.

14. The resin composition according to claim 7, wherein the ethylene-vinyl acetate copolymer resin (B) has a melt flow rate of from 0.1 to 1000 g/10 min.

15. The resin composition according to claim 14, wherein the melt flow rate is from 0.5 to 500 g/10 min.

16. The resin composition according to claim 14, wherein the melt flow rate is from 1 to 100 g/10 min.

17. The resin composition according to claim 14, wherein the melt flow rate is from 5 to 60 g/10 min.

18. The resin composition according to claim 14, wherein the melt flow rate is from 5 to 8 g/10 min.

19. The resin composition according to claim 18, wherein the vinyl acetate content in the ethylene-vinyl acetate copolymer resin (B) is from 70 to 90 wt %.

20. A molded article, comprising:
the resin composition according to claim 7.

* * * * *